(12) United States Patent
Fujimoto (10) Patent No.: US 9,369,067 B2
(45) Date of Patent: Jun. 14, 2016

(54) VIBRATIONAL WAVE DRIVING APPARATUS

(71) Applicant: CANON KABUSHIKI KAISHA, Tokyo (JP)

(72) Inventor: Kosuke Fujimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 573 days.

(21) Appl. No.: 13/913,136

(22) Filed: Jun. 7, 2013

(65) Prior Publication Data

US 2013/0334927 A1  Dec. 19, 2013

(30) Foreign Application Priority Data

Jun. 15, 2012 (JP) ................................. 2012-135451

(51) Int. Cl.
| | |
|---|---|
| H01L 41/09 | (2006.01) |
| H01L 41/047 | (2006.01) |
| H02N 2/00 | (2006.01) |
| H02N 2/02 | (2006.01) |
| H02N 2/10 | (2006.01) |
| H02N 2/16 | (2006.01) |

(52) U.S. Cl.
CPC ............. *H02N 2/0085* (2013.01); *H02N 2/001* (2013.01); *H02N 2/0015* (2013.01); *H02N 2/0035* (2013.01); *H02N 2/026* (2013.01); *H02N 2/103* (2013.01); *H02N 2/163* (2013.01)

(58) Field of Classification Search
USPC ........... 310/323.01–323.06, 323.17, 328, 366
See application file for complete search history.

(56) References Cited

U.S. PATENT DOCUMENTS

| 9,065,036 B2* | 6/2015 | Araki |
| 2006/0061241 A1* | 3/2006 | Sasaki ........................... 310/366 |
| 2007/0188051 A1* | 8/2007 | Kobayashi et al. ....... 310/323.11 |
| 2009/0039806 A1* | 2/2009 | Kudo ............................ 318/116 |

FOREIGN PATENT DOCUMENTS

| JP | 03-074179 A | 3/1991 |
| JP | 2002-142473 A | 5/2002 |
| JP | 2004-320846 A | 11/2004 |

* cited by examiner

*Primary Examiner* — Thomas Dougherty (74) *Attorney, Agent, or Firm* — Canon USA, Inc., IP Division (57) ABSTRACT

A vibrational wave driving apparatus in the present invention includes an elastic member attached to an electromechanical energy transducing member, a pair of electrodes provided on the electromechanical energy transducing member, a wiring unit connecting the pair of electrodes and a voltage applying unit, and a driven body configured to be pressure contacted with the elastic member. The driven body is relatively driven by mechanical vibration of the elastic member generated when an alternating voltage is applied to the pair of electrodes. The wiring unit includes a pair of wiring portions connected to the pair of electrodes, respectively. The pair of wiring portions includes a pair of film-like bases and a pair of conductors formed on surfaces of the pair of film-like bases. The pair of wiring portions is arranged such that the pair of conductors overlaps each other through insulating layers.

12 Claims, 8 Drawing Sheets

FIG. 10

VIBRATIONAL WAVE DRIVING APPARATUS

BACKGROUND OF THE INVENTION

1. Field of the Invention

The present invention relates to a vibrational wave driving apparatus adopting a vibrator that excites driving vibration in an elastic member using an electromechanical energy transducing element as a driving source.

2. Description of the Related Art

Because a vibrational wave driving apparatus vibrates an elastic member using stress generated by an electromechanical energy transducing element and directly performs friction drive on a driven body that is in friction contact with the elastic member, the vibrational wave driving apparatus does not require magnetism as a driving principle thereof. For this reason, the vibrational wave driving apparatus may be composed of a nonmagnetic material and does not significantly affect a magnetic field. Therefore, the vibrational wave driving apparatus is used in an electron beam drawing apparatus that uses a weak magnetic field or a magnetic resonance imaging (MRI) apparatus that operates in a strong magnetic field environment.

In Japanese Patent Laid-Open No. 2002-142473, a vibrational wave driving apparatus is disclosed in which a flexible circuit board having a multilayer structure whose terminal is in contact with electrodes of a piezoelectric element. In Japanese Patent Laid-Open No. 2004-320846, a vibratory driving apparatus that drives a driven body in a linear direction using a combination between two types of bending vibration is disclosed.

Even when a vibrational wave driving apparatus is composed of a nonmagnetic material, electric energy needs to be supplied to a piezoelectric element for driving the vibrational wave driving apparatus. Therefore, current flowing through a wire extending from a power supply apparatus to the piezoelectric element and a wire electrically connecting electrodes on surfaces of a piezoelectric body can generate magnetic noise. When the vibrational wave driving apparatus is used in an electron beam drawing apparatus or an MRI apparatus, which is susceptible to a weak magnetic field, there is a problem in that the magnetic noise adversely affects the operation of the apparatus.

With respect to the wire extending from the power supply apparatus to the piezoelectric element, the magnetic noise may be reduced by using a twisted pair cable or a coaxial cable. On the other hand, with respect to the arrangement of the electrodes of the piezoelectric element, the degree of freedom of the arrangement is low because the electrodes are arranged in accordance with restrictions imposed by the driving principle. The arrangement of the electrodes of the piezoelectric element is determined such that desired driving vibration is excited in an elastic member, and then a flexible printed circuit board is connected to the electrodes. Because driving regions formed in the piezoelectric element corresponding to the plurality of element electrodes are capacitive loads, that is, capacitors, each driving region generates a charge proportional to driving voltage. Furthermore, each driving region generates a charge in accordance with strain caused by mechanical vibration of the piezoelectric element due to a piezoelectric phenomenon. When a driving circuit is formed by connecting the element electrodes using the flexible printed circuit board and driving voltage is applied, current based on the charge caused by the capacitors and the charge caused by the piezoelectric effect flows through wires in the flexible printed circuit board.

When changes caused by minute variations in a magnetic field are detected such as in the case of an MRI apparatus, a magnetic field generated by the above-described current causes variations in a magnetic field of a portion to be measured, a detection signal and a resultant diagnostic image may be affected.

SUMMARY OF THE INVENTION

A vibrational wave driving apparatus that solves the above-described problem includes a plate-shaped electromechanical energy transducing member including a first surface and a second surface that is opposite the first surface, an elastic member attached to the electromechanical energy transducing member on a side of the second surface of the electromechanical energy transducing member, a pair of electrodes provided on the first surface and the second surface, respectively, of the electromechanical energy transducing member, a voltage applying unit configured to apply a voltage to the pair of electrodes, a wiring unit connecting the pair of electrodes and the voltage applying unit, and a driven body configured to be pressure contacted with the elastic member. The driven body is relatively driven by mechanical vibration of the elastic member generated when an alternating voltage is applied to the pair of electrodes. The wiring unit includes a pair of wiring portions connected to the pair of electrodes, respectively. The pair of wiring portions includes a pair of film-like bases and a pair of conductors formed on surfaces of the pair of film-like bases. The pair of wiring portions is arranged such that the pair of conductors overlaps each other through insulating layers.

Further features of the present invention will become apparent from the following description of exemplary embodiments with reference to the attached drawings.

DESCRIPTION OF THE EMBODIMENTS

First Embodiment

Figure 1:
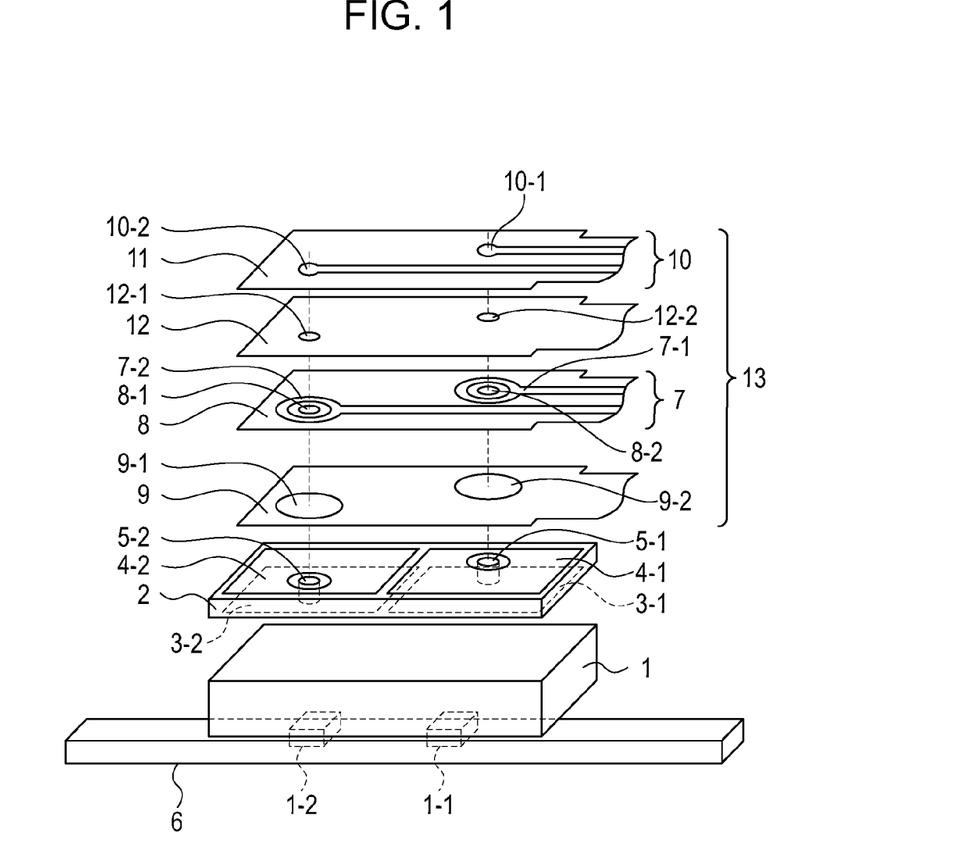
FIG. 1 is an exploded perspective view of a vibrational wave driving apparatus according to a first embodiment of the present invention.
Figure 2:
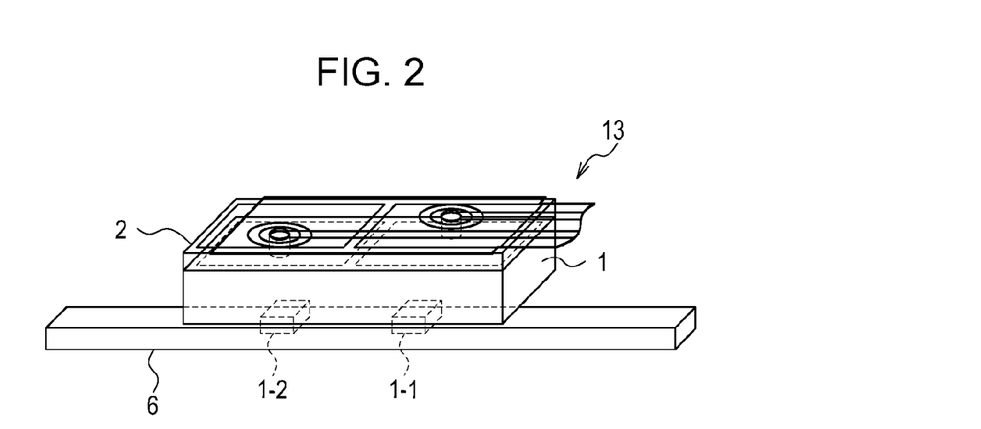
FIG. 2 is a perspective view of the vibrational wave driving apparatus according to the first embodiment of the present invention.

FIG. 2 is a perspective view of a vibrational wave driving apparatus according to a first embodiment of the present invention, and FIG. 1 is an exploded perspective view of the vibrational wave driving apparatus. An elastic member 1 is attached to a piezoelectric body (electromechanical energy transducing member) 2 as a unit by an adhesive. A driven body 6 is pressure contacted with the elastic member 1 through frictional contact portions 1-1 and 1-2. The elastic member 1 is composed of an electrical insulator such as a ceramic. A surface of the piezoelectric body 2 contacting the elastic member 1 will be referred to as a lower surface (second surface), and a surface of the piezoelectric body 2 opposite the lower surface will be referred to as an upper surface (first surface). The elastic member 1 is attached to the piezoelectric body 2 on the lower surface side of the piezoelectric body 2. A multilayer flexible printed circuit board (hereinafter referred to as multilayer FPC) 13 as a wiring unit is attached to the upper surface of the piezoelectric body 2, and power is fed to each electrode of the piezoelectric body 2. Lower electrodes (second electrodes) 3-1 and 3-2 are formed on the lower surface of the piezoelectric body 2. Similarly, upper electrodes (first electrodes) 4-1 and 4-2 are formed on the upper surface of the piezoelectric body 2. The lower electrodes 3-1 and 3-2 and the upper electrodes 4-1 and 4-2 are provided such that the outer shapes thereof match when projected in a thickness direction of the piezoelectric body 2. A piezoelectric element (electromechanical energy transducing element) is configured by the piezoelectric body 2, the upper electrodes 4-1 and 4-2, and the lower electrodes 3-1 and 3-2. The same metal (aluminum, silver, gold, or platinum) is used for the upper electrodes 4-1 and 4-2 and the lower electrodes 3-1 and 3-2. Via holes 5-1 and 5-2, which are through holes connecting the upper and lower surfaces of the piezoelectric body 2 filled with a conductive material, are formed in the piezoelectric body 2, and the lower electrodes 3-1 and 3-2 are electrically connected to surfaces of the via holes 5-1 and 5-2, respectively. Gaps having lengths that are large enough relative to the diameters of the via holes 5-1 and 5-2 that discharge does not occur at a potential difference used for driving are formed in the upper electrodes 4-1 and 4-2 around the via holes 5-1 and 5-2, and accordingly the upper electrodes 4-1 and 4-2 and the via holes 5-1 and 5-2 are electrically insulated from each other, respectively. The piezoelectric body 2 has been subjected to a polarization process in advance in the thickness direction thereof.

Assume that the upper electrode 4-1 is an A(+) electrode, the upper electrode 4-2 is a B(+) electrode, the lower electrode 3-1 and the via hole 5-1 electrically connecting to the lower electrode 3-1 are an A(−) electrode, and the lower electrode 3-2 and the via hole 5-2 electrically connecting to the lower electrode 3-2 are a B(−) electrode. A driving power supply (voltage application unit), which is not illustrated, applies A-phase driving voltages, which are alternating voltages having opposite polarities, between the A(+) and A(−) electrodes. Similarly, the driving power supply applies B-phase driving voltages, which are alternating voltages having opposite polarities, between the B(+) and B(−) electrodes. By applying the A-phase driving voltages and the B-phase driving voltages, two types of vibration (bending vibration) are excited in the elastic member 1, and elliptical vibration caused by the combination between the two types of mechanical vibration in the frictional contact portions 1-1 and 1-2 having protruding shapes relatively drives the driven body 6 in a horizontal direction in FIGS. 1 and 2. The A-phase driving voltages and the B-phase driving voltages may be alternating voltages having a phase difference of 90° therebetween and the same frequency, but because details of a driving method are disclosed in Japanese Patent Laid-Open No. 2004-320846, description of the details of the driving method is omitted.

Figure 3:
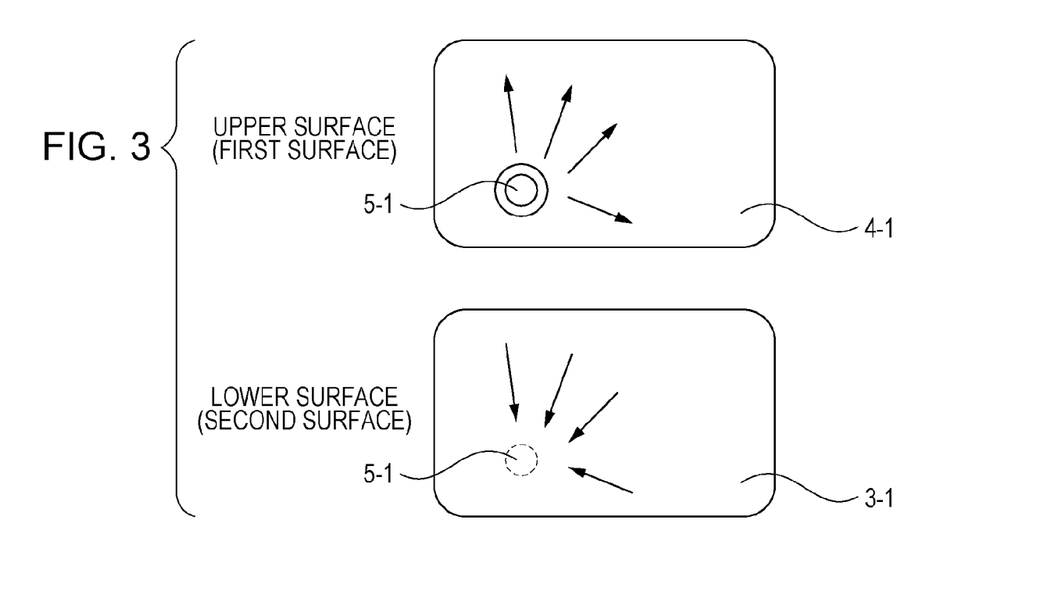
FIG. 3 is a diagram illustrating current flowing through electrodes on upper and lower surfaces according to the first embodiment.

Now, action relating to the element electrodes (the upper electrodes 4-1 and 4-2 and the lower electrodes 3-1 and 3-2) of the piezoelectric element will be described. On the upper and lower surfaces of the piezoelectric body 2, a charge caused by the damped capacitance of the piezoelectric body 2 and a charge according to the vibration strain of the element are generated. Therefore, in addition to a known current component caused by the damped capacitance, a current component based on changes in a charge generated at each electrode caused by changes in the vibration state or the like while the driven body 6 is being driven is generated. The wiring unit for applying voltage to the element electrodes serves as a path of this current caused by the changes in the generated charge. FIG. 3 schematically illustrates the directions of current flowing through the upper and lower electrodes 3-1, 3-2, 4-1, and 4-2. As described later, because the positions of two wiring layers 7 and 10 included in the wiring unit 13 match in the thickness direction, the current flowing through the upper and lower electrodes 3-1, 3-2, 4-1, and 4-2 passes through the same path. Furthermore, the charges generated in the upper and lower electrodes 3-1, 3-2, 4-1, and 4-2 have opposite polarities and the same magnitude. Therefore, at a spatial position far enough relative to the thickness of the piezoelectric element, magnetic fields generated by the current flowing through the upper and lower electrodes 3-1, 3-2, 4-1, and 4-2, respectively, have opposite directions and may be accordingly offset, thereby reducing an external magnetic field as a whole.

The wiring unit 13 is a multilayer FPC, and includes the pair of wiring layers 7 and 10 and a pair of cover layers (insulating layers) 12 and 9 provided between the pair of wiring layers 7 and 10 and between the piezoelectric body 2 and the wiring layer 7. The first wiring layer 7 includes a base 8 composed of a polyimide film and first conductors (copper foil sections) 7-1 and 7-2 provided on a surface of the film, and, similarly, the second wiring layer 10 includes a base 11 composed of a polyimide film and second conductors (copper foil sections) 10-1 an 10-2 provided on a surface of the film. The cover layers 9 and 12 have shapes with which parts of the copper foil sections 7-1 and 7-2 and the copper foil sections 10-1 and 10-2, respectively, are exposed. Circular exposure portions for the copper foil sections 10-1 and 10-2 are formed by covering the copper foil sections 10-1 and 10-2 with the cover layer (first insulating layer) 12 in which circular holes 12-1 and 12-2 having axes indicated by broken lines in FIG. 1 as their respective centers are provided. As a result, the copper foil sections 10-1 and 10-2 are electrically connected to the via holes 5-1 and 5-2, respectively, in the piezoelectric body 2. Similarly, circular exposure portions for the copper foil sections 7-1 and 7-2 connected to the upper electrodes 4-1 and 4-2, respectively, are formed by covering the copper foil sections 7-1 and 7-2 with the cover layer (second insulating layer) 9 in which circular holes 9-1 and 9-2 are provided. As a result, the copper foil section 7-1 and 7-2 are electrically connected to the upper electrodes 4-1 and 4-2, respectively. Because holes 8-1 and 8-2 having the same shape as the holes 12-1 and 12-2 are provided in the base 8, the copper foil sections 10-1 and 10-2 may be electrically connected to the via holes 5-1 and 5-2, respectively, which fill the holes 8-2 and 8-1, respectively. Lead portions of the copper foil sections 7-1, 7-2, 10-1, and 10-2, which are portions of the copper foil sections 7-1, 7-2, 10-1, and 10-2 other than the exposure portions, are covered by the cover layers 9 and 12, and paths of the copper foil sections 10-1 and 10-2 match with paths of the copper foil sections 7-1 and 7-2, respectively, in an in-plane direction through the cover layer 12. That is, the pair of wiring layers 7 and 10 is arranged such that the conductors 7-1 and 10-1 formed on the surfaces of the pair of bases 8 and 11, respectively, overlap in a direction perpendicular to the surfaces of the pair of bases 8 and 11 (although the copper foil sections 7-1 and 10-1 do not completely overlap around the hole 12-2, arrangement including a close, complementary positional relationship is also regarded as a form of overlap).

The current flowing to the upper and lower electrodes 3-1, 3-2, 4-1, and 4-2, which face each other through the piezoelectric body 2, has different polarities and the same magnitude. In addition, by using the wiring unit 13 having the above-described configuration, the current flowing through the copper foil sections 7-1, 7-2, 10-1, and 10-2 has opposite directions through the cover layer 12, and accordingly the magnetic fields generated around the copper foil sections 7-1, 7-2, 10-1, and 10-2 are offset, thereby reducing a leakage field to the outside.

As described above, by using the same shape of element electrodes, the same wiring material for the element electrodes, and the same paths to the element electrodes, generation of an external magnetic field caused by the internal wiring of the vibrational wave driving apparatus may be reduced.

Second Embodiment

Figure 4:
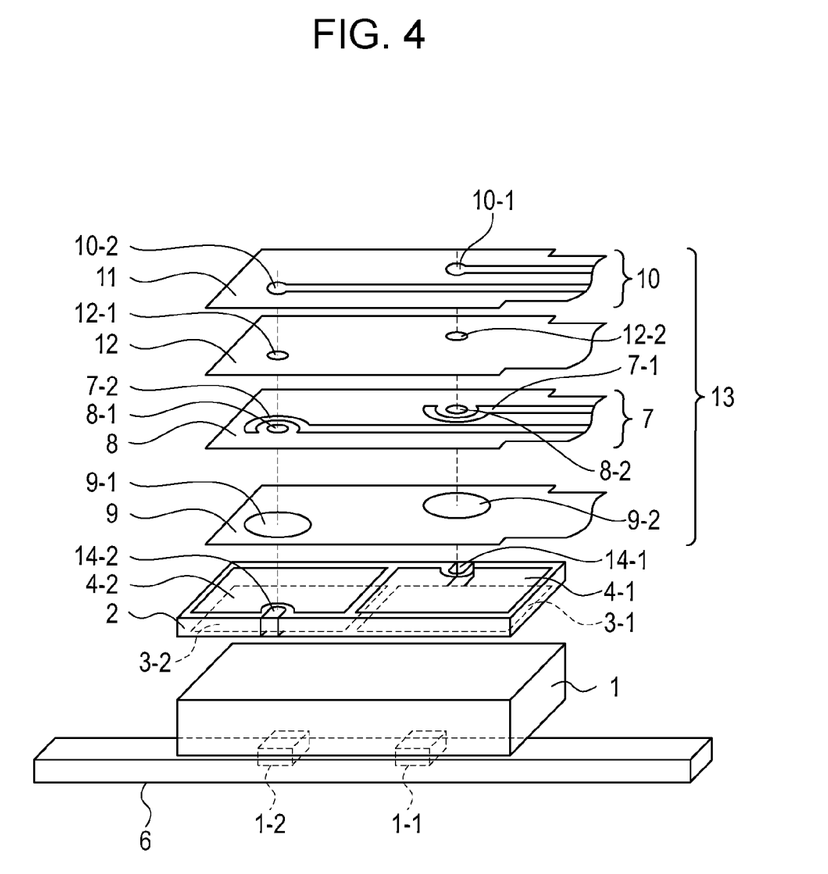
FIG. 4 is an exploded perspective view of a vibrational wave driving apparatus according to a second embodiment of the present invention.

FIG. 4 is an exploded perspective view of a vibrational wave driving apparatus according to a second embodiment of the present invention. The same components as those according to the first embodiment are given the same reference numerals. Although the lower electrodes 3-1 and 3-2 and the wiring layer 10 are connected to each other by the via holes 5-1 and 5-2, respectively, formed in the piezoelectric body 2 in the first embodiment, piezoelectric body side surface connection portions (hereinafter referred to as side surface connection portions) 14-1 and 14-2 that are provided on side surfaces of a piezoelectric body 2 and that extend to upper and lower surfaces of the piezoelectric body 2 are used in the present embodiment. After upper and lower electrodes 3 and 4 are formed, the side surface connection portions 14-1 and 14-2 are formed by depositing metal through vapor deposition while masking other portions. As another method for forming the side surface connection portions 14-1 and 14-2, parts of the side surface connection portions 14-1 and 14-2 included in the upper and lower surfaces of the piezoelectric body 2 may be formed at the same time as the upper and lower electrodes 3 and 4, and after a polarization process is performed, conductive paint may be applied to the side surfaces of the piezoelectric body 2 through screen printing, in order to connect the parts of the side surface connection portions 14-1 and 14-2 included in the upper and lower surfaces of the piezoelectric body 2 to each other. The side surface connection portions 14-1 and 14-2, which are electrically connected to the lower electrodes 3-1 and 3-2, respectively, are connected to copper foil sections 10-1 and 10-2 having exposure portions using the same configuration as the first embodiment. The shapes of copper foil sections 7-1 and 7-2 have been changed to arcs, so that the copper foil sections 7-1 and 7-2 are not short-circuited to the side surface connection portions 14-1 and 14-2, respectively. Thus, by connecting the lower electrodes 3-1 and 3-2 and the wiring layer 10 to each other through wires on the side surfaces of the piezoelectric body 2, the same advantageous effects as those produced by the first embodiment may be produced. In addition, because it is possible to avoid a decrease in the bending fracture tolerance of the piezoelectric body 2 due to the via holes 5-1 and 5-2 used in the first embodiment, a higher output may be generated as a vibrational wave driving apparatus.

Third Embodiment

FIGS. 5A to 5E are exploded perspective views of a vibrational wave driving apparatus according to a third embodiment of the present invention. The present embodiment relates to an annular vibrational wave driving apparatus, and a difference from the above-described first and second embodiments is that a plurality of electrodes to which the same potential is applied are provided in the present embodiment.

Figure 5A:
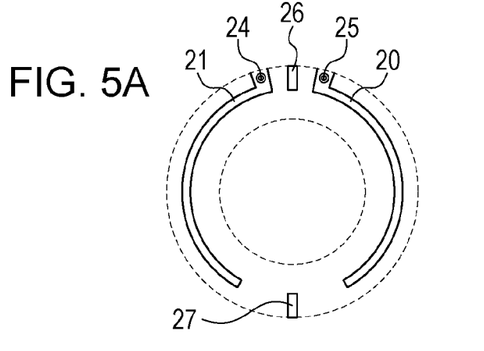
FIGS. 5A to 5E are exploded perspective views of a vibrational wave driving apparatus according to a third embodiment of the present invention.
Figure 5B:
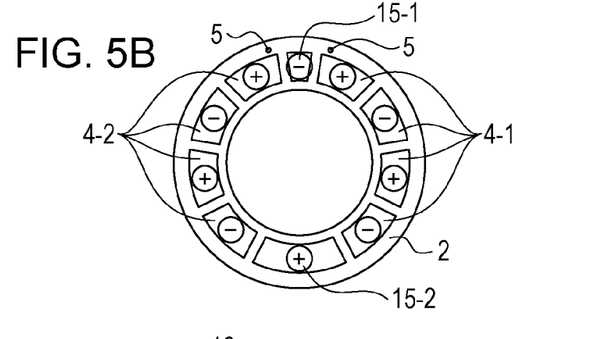
Figure 5C:
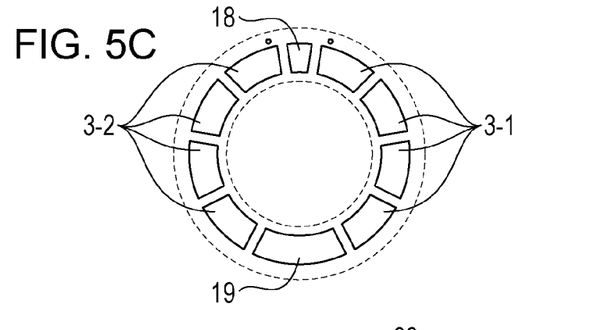

As illustrated in FIG. 5B, upper electrodes 4 (4-1, 4-2, 15-1, and 15-2) and via holes 5 are provided in an upper surface of a disc-shaped piezoelectric body 2, and, as illustrated in FIG. 5C, lower electrodes 3 (3-1, 3-2, 18, and 19) are provided on a lower surface of the piezoelectric body 2. The upper electrodes 4-1 are assumed to be first electrodes in a first group, and the upper electrodes 4-2 are assumed to be first electrodes in a second group. Similarly, the lower electrodes 3-1 are assumed to be second electrodes in the first group, and the lower electrodes 3-2 are assumed to be second electrodes in the second group. The shapes of the first electrodes in the first group and the shapes of the second electrodes in the first group correspond to each other (are substantially the same). Similarly, the shapes of the first electrodes in the second group and the shapes of the second electrodes in the second group correspond to each other (are substantially the same). A polarization process is performed by applying a ground potential to all the lower electrodes 3 and potentials that cause the piezoelectric body 2 to generate polarization in positive and negative directions to the upper electrodes 4, in order to form a polarization pattern of the piezoelectric body 2 illustrated in FIG. 5B. The via holes 5 are through holes connecting the upper and lower surfaces of the piezoelectric body 2 filled with a conductive material. The lower surface of the piezoelectric body 2 is attached to an annular elastic member (not illustrated), and generates five types of bending elastic vibration in each cycle of the annulus. If the circumference of the annulus is denoted by $5\lambda$, the arc lengths of the electrodes 15-1 and 18 are $\lambda/4$, those of the electrodes 15-2 and 19 are $3\lambda/4$, and those of the upper and lower electrode 3 and 4 are $\lambda/2$ in this pattern. The potential applied between the upper electrodes 4-1 and the lower electrodes 3-1 is determined as an A-phase potential, and the potential applied between the upper electrodes 4-2 and the lower electrodes 3-2 is determined as a B-phase potential. By using alternating potentials having a temporal phase difference of 90° as the A-phase potential and the B-phase potential, bending traveling waves are generated.

Figure 5D:
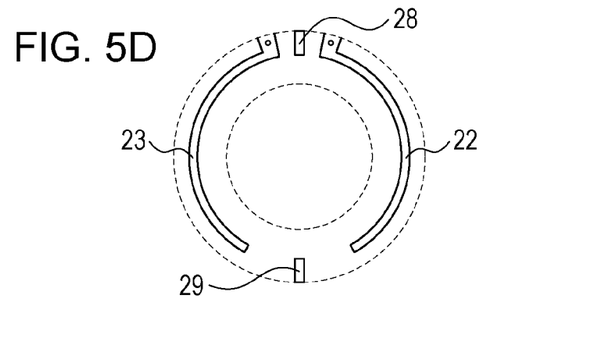

FIGS. 5A and 5D illustrate the shapes of wiring portions provided on the upper and lower surfaces of the piezoelectric body 2 after the polarization process. An upper wiring portion (first wiring portion) 20 is an arc-shaped wire including a circular opening surrounding the via hole 5 at an end thereof. The upper wiring portion 20 is formed on the A-phase electrodes 4-1 through vapor deposition, printing, or the like, and electrically short-circuits the A-phase electrodes 4-1 to one another. Similarly, an upper wiring portion (second wiring portion) 21 is formed on the B-phase electrodes 4-1, and electrically short-circuits the B-phase electrodes 4-2 to one another. Lands 24 and 25 located at the center are circular conductive members connected to the two via holes 5, respectively, and arranged along the same axes as the circular openings of the upper wiring portions 21 and 20, respectively. Lower wiring portions 22 and 23 are electrically connected to the two via holes 5, respectively. The lower wiring portion (third wiring portion) 22 short-circuits the A-phase ground electrodes 3-1 to one another, and the lower wiring portion (fourth wiring portion) 23 short-circuits the B-phase ground electrodes 3-2 to one another. The upper wiring portions 20 and 21 have the same shapes as the lower wiring portion 22 and 23, respectively, and these wiring portions are arranged such that the upper wiring portions 20 and 21 overlap the lower wiring portion 22 and 23, respectively. Short circuit wiring portions 28 and 29 are provided so that the lower electrodes 18 and 19 have the same potentials as the upper electrodes 15-1 and 15-2, respectively, the lower electrodes 18 and 19 and the upper electrodes 15-1 and 15-2 not being supplied with driving voltage. The short circuit wiring portions 28 and 29 are connected to short circuit wiring portions 26 and 27, respectively, provided on the upper surface of the piezoelectric body 2 through side surfaces of the piezoelectric body 2. Side surface connection portions, which are not illustrated, are provided using the same method as that described in the second embodiment.

Figure 5E:
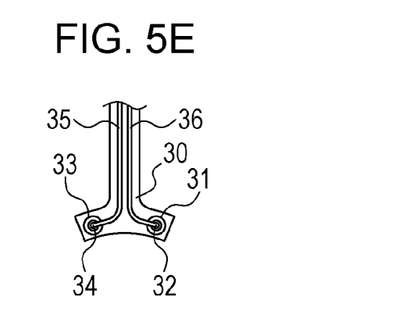

FIG. 5E illustrates the configuration of a multilayer FPC 30, at ends of which four connection portions are provided. The multilayer FPC 30 is connected to connection regions including the via holes 5 at an edge of the upper surface of the piezoelectric body 2 by bonding, using an anisotropic conductive adhesive, or the like. Lands 31, 32, 33, and 34 provided on the multilayer FPC 30 are connected to the upper wiring portion 20, the land 25 on the upper surface of the piezoelectric body 2, the upper wiring portion 21, and the land 24 on the upper surface of the piezoelectric body 2, respectively. Two wiring layers having a cover layer therebetween are provided along each of paths 35 and 36 provided on the multilayer FPC 30. Two wiring layers connected to the lands 31 and 32, respectively, are provided along the path 36 in an overlapped manner, and two wiring layers connected to the lands 33 and 34, respectively, are provided along the path 35 in an overlapped manner. Positive and negative voltages for driving the A phase are applied to the path 36, and positive and negative voltages for driving the B phase are applied to the path 35, thereby causing current to flow.

In the present embodiment, in an annular vibrational wave driving apparatus that needs to be provided with a plurality of electrode regions to which the same potential is to be applied, upper and lower electrodes of the piezoelectric body 2 and connection paths to the upper and lower electrodes corresponding to A-phase driving and B-phase driving are configured to have the same shapes and arranged in such a way as to overlap each other. Therefore, current paths may become the same between the positive and negative voltages, thereby reducing a magnetic field generated around the vibrational wave driving apparatus.

Fourth Embodiment

Figure 6A:
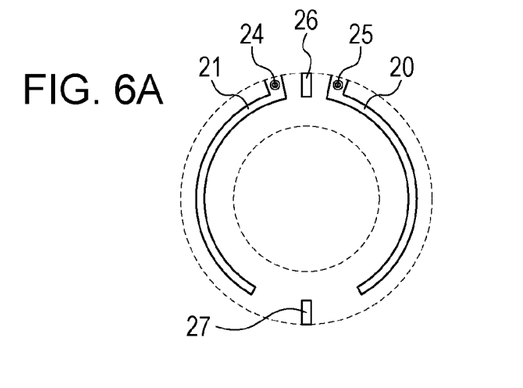
FIGS. 6A to 6D are exploded perspective views of a vibrational wave driving apparatus according to a fourth embodiment of the present invention.
Figure 6B:
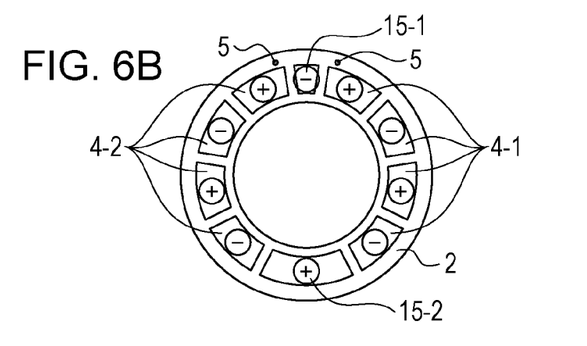
Figure 6C:
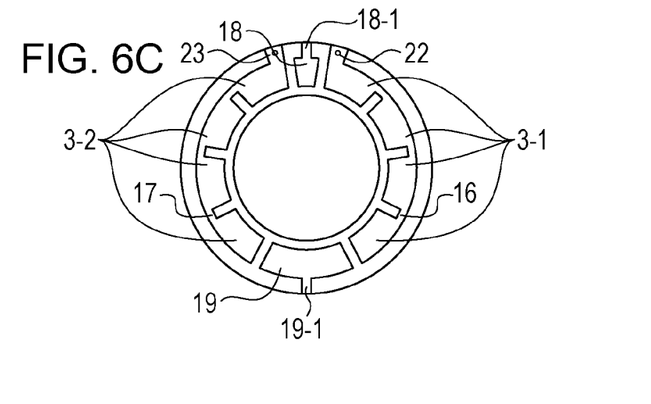
Figure 6D:
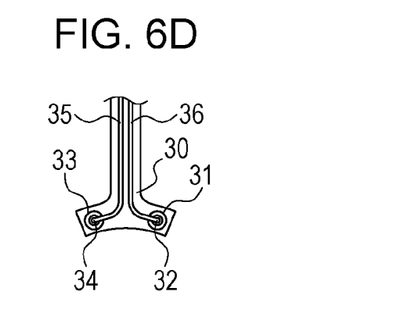

FIGS. 6A to 6D are exploded perspective views of a vibrational wave driving apparatus according to a fourth embodiment of the present invention. A difference between the present embodiment and the third embodiment is that lower wiring portions are integrated with lower electrodes in the present embodiment. The same components as those according to the third embodiment are given the same reference numerals. FIGS. 6B and 6C illustrate upper and lower surfaces of a piezoelectric body 2. Because the shapes of lower electrodes 3 are equivalent to the shape of a combination between upper wiring portions 20 and 21 illustrated in FIG. 6A and upper electrodes 4 illustrated in FIG. 6B, current paths become the same between the upper and lower surfaces. As with the other embodiments, the generated external magnetic field may be reduced. Furthermore, in the present embodiment, a step relating to formation of lower wiring portions after the polarization process may be omitted. Therefore, irregularities in the lower surface caused by two steps of forming conductive films may be reduced, and accordingly variations in the thickness of an adhesive layer used for attaching the lower surface to an elastic member may be reduced, thereby reducing a mechanical loss of the elastic member at an attachment interface.

Fifth Embodiment

FIGS. 7A to 7D are exploded perspective views of a vibrational wave driving apparatus according to a fifth embodiment of the present invention. Differences between the present embodiment and the fourth embodiment are that, in the present embodiment, upper wiring portions 20 and 21 and lower electrodes 3 have arc shapes having a uniform width and connection between the lower electrodes 3 and lands 24 and 25 on an upper surface is realized not by via holes but through side surface connection as in the case of the short circuit wiring portions.

Figure 7A:
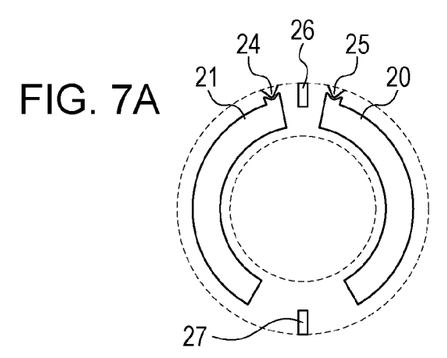
FIGS. 7A to 7D are exploded perspective views of a vibrational wave driving apparatus according to a fifth embodiment of the present invention.
Figure 7B:
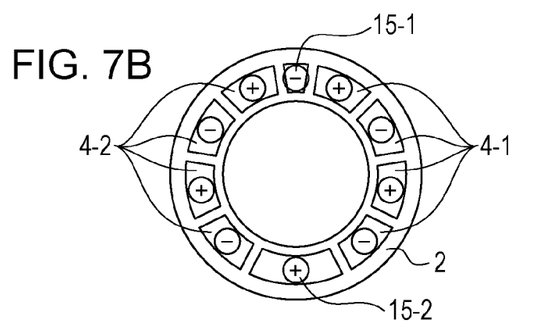
Figure 7C:
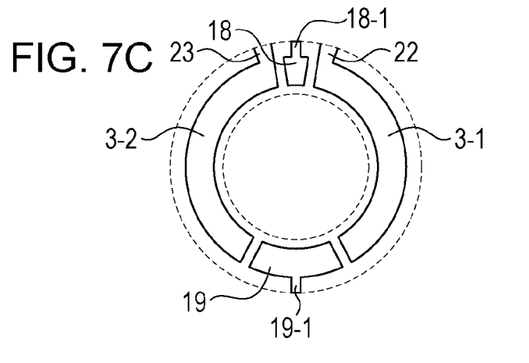

The same components as those according to the fourth embodiment are given the same reference numerals. FIG. 7A illustrates the shapes of the upper wiring portions 20 and 21, which have arc shapes having a uniform width. FIG. 7B illustrates the same configuration as those according to the third and fourth embodiments. FIG. 7C illustrates the shapes of the lower electrodes 3. The lower electrode 3-1 has a shape corresponding to (substantially the same as) the shape of the upper wiring portion 20, and the lower electrode 3-2 has a shape corresponding to (substantially the same as) the shape of the upper wiring portion 21. The lower electrodes 3-1 and 3-2 include terminals 22 and 23, respectively, connected to side surface connection portions (not illustrated). When the upper wiring portions 20 and 21 have been formed using conductive paint or the like after a piezoelectric element is subjected to a polarization process, the terminals 22 and 23 of the lower electrodes 3 are connected to the upper lands 25 and 24, respectively, through the side surface connection portions. Similarly, electrodes 18 and 19, to which no potential is applied, include terminals 18-1 and 19-1, respectively, which are connected to short circuit wiring portions 26 and 27, respectively. The short circuit wiring portions 26 and 27 are electrically connected to upper electrodes 15-1 and 15-2, respectively, and both surfaces of portions of the piezoelectric body 2 that are not driven become electrically connected to each other. The side surface connection portions are formed through printing, vapor deposition, or the like of a conductive material after the upper wiring portions 20 and 21 are formed.

Figure 7D:
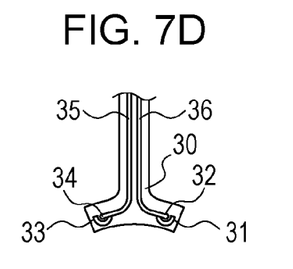

A multilayer FPC 30 illustrated in FIG. 7D has the same layer configuration as that according to the fourth embodiment, but the shapes of lands are different. Lands 31 and 33 connected to the upper wiring portions 20 and 21, respectively, have semicircular shapes so that the lands 31 and 33 are not short-circuited to the lands 25 and 24, respectively, which are electrically connected to the upper surface of the piezoelectric body 2 from the lower surface through a side surface. Lands 32 and 34 connected to the lower electrodes 3 are the same as those according to the fourth embodiment.

In the present embodiment, by using the upper wiring portions 20 and 21 and the lower electrodes 3 having arc shapes having a uniform width, current paths to the upper and lower surfaces of the piezoelectric body 2 match as in the other embodiments, and accordingly the generated external magnetic field may be reduced. In addition, because it is possible to further reduce irregularities in electrode regions in portions attached to an elastic member that may affect driving force, a vibrational loss of a vibrator may be reduced. Furthermore, since side surface wiring is used instead of via holes, the fracture limit of the element that would otherwise be affected by existence of through holes may be improved, thereby making it possible to configure a vibrational wave driving apparatus having a higher efficiency and a higher output.

Sixth Embodiment

Figure 8:
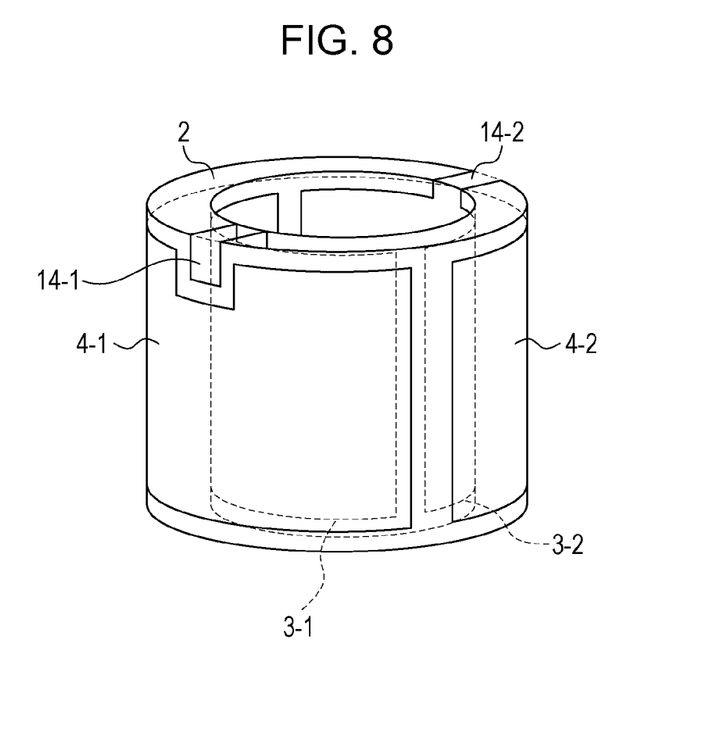
FIG. 8 is a perspective view of a piezoelectric body of a vibrational wave driving apparatus according to a sixth embodiment of the present invention.
Figure 9:
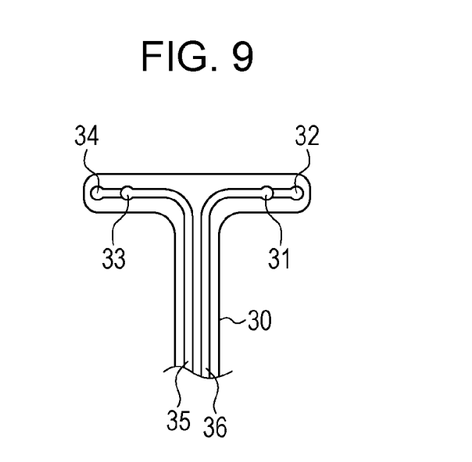
FIG. 9 is a perspective view of a wiring unit of the vibrational wave driving apparatus according to the sixth embodiment of the present invention.
Figure 10:
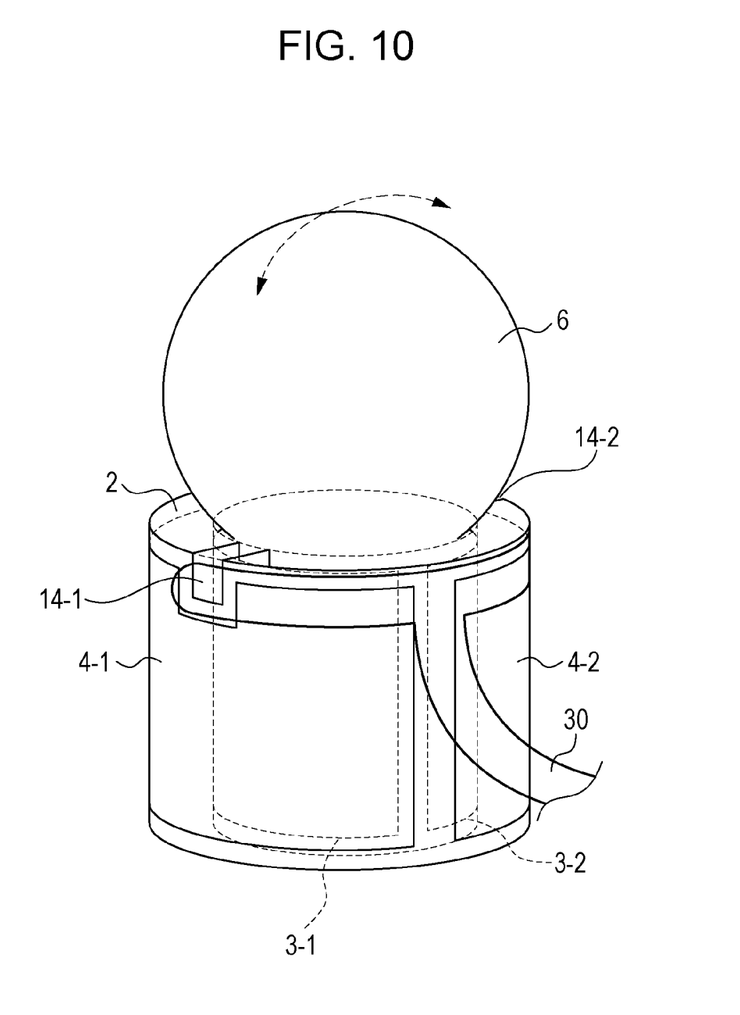
FIG. 10 is a perspective view of the vibrational wave driving apparatus according to the sixth embodiment of the present invention.

FIGS. 8 to 10 are perspective views of a piezoelectric element, a wiring unit, and a vibrational wave driving apparatus according to a sixth embodiment of the present invention. As illustrated in FIG. 8, a piezoelectric body 2 has a cylindrical shape, and electrodes thereof are arranged such that the shapes of the electrodes in inner and outer surfaces become the same when viewed in a cylindrical coordinate system having a symmetry axis as a central axis. FIG. 9 is a plan view of a multilayer FPC 30, which is wound onto a portion of a side surface of the piezoelectric body 2 close to an upper surface of the piezoelectric body 2 such that the electrodes come into contact with corresponding lands. In the present embodiment, the natural frequency of the stretching vibration of a cylindrical piezoelectric vibrator in an axial direction and that of the bending vibration that bends the symmetry axis of the cylinder substantially match, and these vibrations are simultaneously excited, which rotates a spherical driven body 6 in a direction indicated by an arrow of a broken line illustrated in FIG. 10. The driven body 6 is composed of a nonmagnetic material such as a ceramic.

The piezoelectric body 2 includes inner electrodes 3-1 and 3-2 and outer electrodes 4-1 and 4-2 corresponding to the inner electrodes 3-1 and 3-2, respectively. The inner electrodes 3-1 and 3-2 are electrically connected to connection electrodes 14-1 and 14-2, respectively, which extend to the side surface of the piezoelectric body 2. The connection electrodes 14-1 and 14-2 are located at the centers of the outer electrodes 4-1 and 4-2, respectively, in a circumferential direction. Electrode exposure portions 34 and 32 of the multilayer FPC 30 are connected to the connection electrodes 14-1 and 14-2, respectively, and electrode exposure portions 33 and 31 are connected to the outer electrodes 4-1 and 4-2, respectively. The multilayer FPC 30 has a multilayer structure in which cover layers are provided between the electrode exposure portions 31 to 34 such that the electrode exposure portions 31 to 34 expose while the electrodes are insulated from one another. Two wiring layers that are connected to the electrode exposure portions 33 and 34, respectively, that are insulated from each other, and that have the same shape are provided along the same path 35 and connected to a power supply apparatus, which is not illustrated. Similarly, two wiring layers that are connected to the electrode exposure portions 31 and 32, respectively, that are insulated from each other, and that have the same shape are provided along the same path 36 and connected to the power supply apparatus, which is not illustrated.

Not only in the case of the shape of a plate-shaped piezoelectric body projected onto a plane, but also in the case of a cylindrical shape, the distribution of current flowing through element electrodes may match between the positive and negative directions by matching the shapes of wiring in a radial direction. In addition, current flowing through the wiring of the multilayer FPC 30 may match between the positive and negative directions. Therefore, in the present embodiment, too, it is possible to reduce the magnetic field generated by current flowing through the vibrational wave driving apparatus. By combining a plurality of driving apparatuses according to the present embodiment, a robot arm or a finger mechanism may be configured. Furthermore, a manipulator that does not significantly affect a diagnostic image when mounted on an MRI apparatus or the like may be configured.

According to the present invention, a magnetic field generated by the capacitive current and the mechanical strain current of a piezoelectric element may be reduced by matching current paths in the wiring of the piezoelectric element between driving regions of the piezoelectric element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-135451 filed Jun. 15, 2012, which is hereby incorporated by reference herein in its entirety.

What is claimed is:

1. A vibrational wave driving apparatus comprising:
   a plate-shaped electromechanical energy transducing member including a first surface and a second surface that is opposite the first surface;
   an elastic member attached to the electromechanical energy transducing member on a side of the second surface of the electromechanical energy transducing member;
   a pair of electrodes provided on the first surface and the second surface, respectively, of the electromechanical energy transducing member;
   a voltage applying unit configured to apply a voltage to the pair of electrodes;
   a wiring unit connecting the pair of electrodes and the voltage applying unit; and
   a driven body configured to be pressure contacted with the elastic member,
   wherein the driven body is relatively driven by mechanical vibration of the elastic member generated when an alternating voltage is applied to the pair of electrodes,
   wherein the wiring unit includes a pair of wiring portions connected to the pair of electrodes, respectively,
   wherein the pair of wiring portions includes a pair of film-like bases and a pair of conductors formed on surfaces of the pair of film-like bases, and
   wherein the pair of wiring portions is arranged such that the pair of conductors overlaps each other through insulating layers.

2. The vibrational wave driving apparatus according to claim 1,
   wherein the pair of electrodes has the same shape and is composed of the same material.

3. The vibrational wave driving apparatus according to claim 1,
   wherein the pair of electrodes includes a first electrode formed on the first surface and a second electrode formed on the second surface,
   wherein the pair of conductors includes a first conductor connected to the first electrode and a second conductor connected to the second electrode, and wherein the second electrode and the second conductor are connected to each other through a via hole in the electromechanical energy transducing member.

4. The vibrational wave driving apparatus according to claim 3,
wherein the first conductor includes a circular exposure portion formed at an end of the first conductor and a lead portion connected to the exposure portion,
wherein the second conductor includes an annular exposure portion formed at an end of the second conductor and a lead portion connected to the exposure portion,
wherein the insulating layers include a first insulating layer that is arranged between the first conductor and the second conductor and that includes a hole corresponding to the circular exposure portion and a second insulating layer that is arranged between the first conductor and the first electrode and that includes a hole corresponding to the annular exposure portion,
wherein the circular exposure portion is connected to the via hole through the hole in the second insulating layer and the hole in the first insulating layer, and
wherein the annular exposure portion is connected to the first electrode through the hole in the second insulating layer.

5. The vibrational wave driving apparatus according to claim 4,
wherein the lead portion of the first conductor and the lead portion of the second conductor are arranged in such a way as to overlap each other.

6. The vibrational wave driving apparatus according to claim 1,
wherein the electromechanical energy transducing member has a disc shape,
wherein the pair of electrodes includes a plurality of first electrodes formed on the first surface and second electrodes formed on the second surface in correspondence with the plurality of first electrodes,
wherein the plurality of first electrodes include first electrodes in a first group and first electrodes in a second group, and
wherein a first wiring portion that short-circuits the first electrodes in the first group and a second wiring portion that short-circuits the first electrodes in the second group are included.

7. The vibrational wave driving apparatus according to claim 6,
wherein the second electrodes include second electrodes in the first group having shapes corresponding to shapes of the first electrodes in the first group and second electrodes in the second group having shapes corresponding to shapes of the first electrodes in the second group, and
wherein a third wiring portion that short-circuits the second electrodes in the first group and a fourth wiring portion that short-circuits the second electrodes in the second group are included.

8. The vibrational wave driving apparatus according to claim 7,
wherein the first wiring portion and the third wiring portion have the same shape, and the second wiring portion and the fourth wiring portion have the same shape.

9. The vibrational wave driving apparatus according to claim 6,
wherein the second electrodes include an arc-shaped electrode having a uniform width corresponding to the first electrodes in the first group and an arc-shaped electrode having a uniform width corresponding to the first electrodes in the second group.

10. The vibrational wave driving apparatus according to claim 9,
wherein the first wiring portion has a shape corresponding to the arc-shaped electrode having the uniform width corresponding to the first electrodes in the first group, and
wherein the second wiring portion has a shape corresponding to the arc-shaped electrode having the uniform width corresponding to the first electrodes in the second group.

11. The vibrational wave driving apparatus according to claim 6,
wherein the pair of conductors includes a first conductor connected to the first wiring portion and a second conductor connected to the second wiring portion, and
wherein the second wiring portion and the second conductor are connected to each other through a via hole in the electromechanical energy transducing member.

12. The vibrational wave driving apparatus according to claim 6,
wherein the pair of conductors includes a first conductor connected to the first wiring portion and a second conductor connected to the second wiring portion, and
wherein the second wiring portion and the second conductor are connected to each other through a side surface connection portion provided on a side surface of the electromechanical energy transducing member.

* * * * *